(12) United States Patent
Healey

(10) Patent No.: US 6,372,072 B1
(45) Date of Patent: Apr. 16, 2002

(54) COMPOSITE LAMINATE MANUFACTURE WITH MULTIAXIAL FABRICS

(75) Inventor: Michael J Healey, Bristol (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/449,997

(22) Filed: Nov. 26, 1999

(30) Foreign Application Priority Data

Dec. 4, 1998 (GB) ............................... 9826681

(51) Int. Cl.[7] .............................. B32B 5/26; B64C 1/00
(52) U.S. Cl. ...................... 156/148; 156/166; 156/299; 442/204
(58) Field of Search ..................... 156/60, 166, 180, 156/175, 299, 148; 442/204

(56) References Cited

U.S. PATENT DOCUMENTS

| 4,438,173 | A | * | 3/1984 | Trost ........................... 442/204 |
| 4,571,355 | A | * | 2/1986 | Elrod ........................... 428/102 |
| 4,606,961 | A | | 8/1986 | Munsen et al. |
| 4,786,033 | A | | 11/1988 | Kofler |
| 5,055,242 | A | * | 10/1991 | Vane ........................... 156/148 |
| 5,688,577 | A | | 11/1997 | Smith et al. |
| 5,702,993 | A | * | 12/1997 | Kubomura et al. ......... 442/204 |
| 5,718,212 | A | * | 2/1998 | Allshouse ................ 124/25.6 |

FOREIGN PATENT DOCUMENTS

| EP | 0 361 376 | 4/1990 |
| EP | 0 396 281 | 11/1990 |
| WO | WO 89/01123 | 2/1989 |

* cited by examiner

*Primary Examiner*—Jeff H. Aftergut
(74) *Attorney, Agent, or Firm*—Nixon & Vanderhye P.C.

(57) ABSTRACT

A method of manufacturing a composite laminate and a composite laminate manufactured according to the method are provided. The laminate comprises a series of fabric plies (1 to 15) of fibrous reinforcing material set in plastics matrix material. The method includes the steps of providing a relatively small number of fabric styles from which to choose; selecting at least one of those fabric styles according to design requirements for a particular portion of the laminate; laying up that portion with the said selection, and repeating the selection and layup steps as required to complete the layup of the laminate.

9 Claims, 1 Drawing Sheet

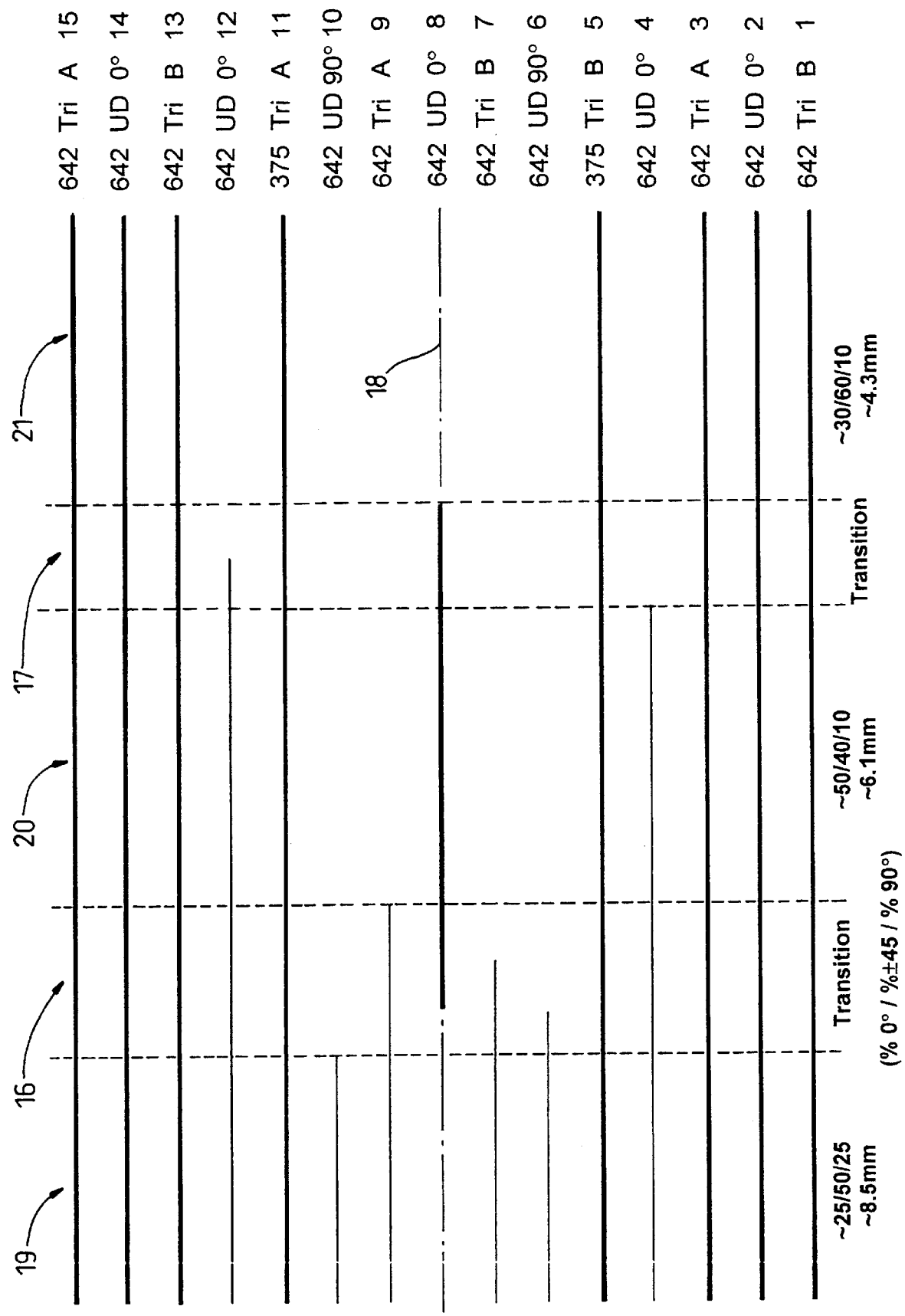

COMPOSITE LAMINATE MANUFACTURE WITH MULTIAXIAL FABRICS

BACKGROUND OF THE INVENTION

1. Field of the Invention

This invention relates to the design and manufacture of composite laminates, particularly fibre reinforced composite laminates, and more particularly to such laminates which are constructed from a series of plies of fabric, each ply being comprised of reinforcing fibres layed substantially in a single orientation. Such laminates find utility in the manufacture of highly stressed structures, for example in the manufacture of aircraft wings, where the ratio of strength and stiffness to weight is critical.

2. Description of Prior Art

An optimised aircraft wing, especially one made of carbon fibre based composite, is a very complex structure due to the variety of functions required of different types of wing component, eg. skins, stringers, ribs and spars. A potential advantage of composites over metals is that the strength and stiffness of the structure can be tailored by varying the percentage content of reinforcing fibre, the fibre orientation and sometimes the fibre modulus. In this way, for example, different spanwise and chordwise moduli in a skin can be achieved, varying from wing root to tip.

A unidirectional "prepreg" tape, typically 0.125 mm–0.25 mm thick and 75 mm to 300 mm wide, is traditionally used within the aerospace industry for primary structure applications to achieve these qualities.

Prepreg material is fibrous reinforcing material pre-impregnated with a controlled viscosity plastics matrix material, usually epoxy resin. The above method of laying up the laminate allows a very high degree of design tailorability and thus the obtaining of an optimum strength and stiffness laminate. However the layup process for a large thick structure is very slow for a number of reasons.

Firstly, as 4 to 8 layers of tape are required for every 1 mm of laminate thickness, a very large number of "passes" of the tape head can be required. Secondly, in order to lay up the tape in the required fibre orientations (the fibre orientation of the tape itself is always lengthwise), the tape laying head will need to move across the layup in all those directions of orientation, thus requiring an expensive head movement apparatus and complex computer software. Thirdly, for a 3-dimensional laminate like portions of an aircraft wing, a further degree of freedom of the tape laying head will be required to accommodate the 3-D form.

Hence, to lay up a laminate of the size and shape of a modern passenger aircraft wing requires both very expensive tape laying apparatus and a long layup time. Also the amount and cost of scrap consumables, eg. release paper, can be high for tape laying methods.

An alternative design approach for laying up laminates, in particular thick laminates, is to use thicker multi-ply fabrics which may also be much wider than tapes, eg 1.26 m or more, and therefore much faster to lay up.

Non crimp fabrics, "NCFs", are a type of fabric in which the fibre tows in a ply of the fabric lie in their particular direction of orientation substantially without crimping. Any number of plies of fabric may be held together, prior to the application of matrix material, by stitching or by a low level of binder to form a fabric of a given "style". In the context of unidirectional fabric plies the "style" is taken to mean the areal mass, for the purpose of this invention. Also included within the definition of NCF, for the purposes of this invention, are fabrics known as "uniweaves" which are comprised of unidirectional fibres lightly woven about thin thread.

Multi-ply NCFs can currently be in styles having up to seven plies of fabric. Each ply will normally comprise unidirectionally orientated fibres and each ply will normally have fibres orientated in a direction different from its neighbour. In the manufacture of aerospace vehicle structures, and in other high strength applications, commonly used fibre orientations are as follows: 0 degrees ("0 deg")/warp (along a datum line, eg spanwise of an aircraft wing); plus or minus 45 deg; 90 deg/weft. It is possible to use other directions of fibre orientation, eg 30 deg and 60 deg, and any such other directions should be taken as included within the scope of this invention. The use of the following terms: 0 deg; plus or minus 45 deg; 90 deg in this specification is not intended to be limiting and other fibre orientations not differing substantially from the quoted figures are included within the meanings of these terms.

Such fabrics which include several plies of unidirectional fibres at different orientations are known as "multiaxial NCFs". A key advantage of using multi-axial fabrics is that they can be laid up in a single direction whilst providing fibre orientations in all the required directions for optimum stress-bearing characteristics. Huge time savings can result for the layup process when these fabrics are used.

An example of such a multiaxial fabric comprising a style of seven plies, as mentioned above, could have through-thickness fibre orientations of 0 deg (20%); +45 deg (12.5%); −45 deg (12.5%); 90 deg (10%); −45 deg (12.5%); +45 deg (12.5%); 0 deg (20%). Such a style would be both balanced and symmetrical (ie non handed) about its neutral axis and could be made up by the combination of a triaxial fabric (preferably NCF) with a second identical but reversed, ie oppositely handed, triaxial, both sandwiching a 90 deg uniweave fabric between them. Alternatively, a triaxial fabric could be combined with a quadraxial fabric.

The thickness of NCF fabrics, for aerospace applications, can be from 0.1 mm (for say a single ply NCF) to 1.5 mm for a multi-ply NCF. Based on unidirectional tape experience, ply thicknesses may be suitably 0.5 mm possibly up to 1.0 mm, for an angular change in fibre orientation between plies of 45 deg, and say 0.25 mm thick for an angular change of 90 deg.

Historically, a number of design rules have arisen for this type of laminate, based on analysis and experience with unidirectional tape. Such rules may differ depending on the design/certification philosophy of the aircraft manufacturer concerned but are generally stated here to be as follows:

- 45 deg plies are required on the exterior of a composite structure for damage tolerance and softening of stress inputs into adhesive bondlines;
- the thickness of a unidirectional ply (ply of fabric having unidirectional fibre orientation) should not normally exceed 0.5 mm if the angle change between it and the adjacent ply is 45 deg;
- layups should ideally be balanced and symmetrical about the neutral axis of the laminate;
- 90 deg plies are generally recommended at a level of at least 10% largely to control Poisson ratio effect, or higher if required for bolt-bearing applications;
- the distribution of the ply orientations should be as evenly spaced throughout the laminate as possible;
- the distance between ply dropoffs should not be less than 20×the ply thickness, spanwise and 10×the ply thickness chordwise - also the lowest possible dropoff height, i.e. thickness of plies at dropoff, is always desired.

The layup design for an aircraft composite wing will depend on the design approach and the method of assembly, ie. bonded or bolted. If a soft skin - hard stringer approach is used the multiaxial fabrics may vary in style from 30–60% for the 0 deg plies; 40–60% for the 45 deg plies and approximately 10% for the 90 deg plies. A higher requirement for 90 deg plies will apply for higher load input areas. For stringers, a layup of 67% for 0 deg plies; 23% for 45 deg plies and 10% for 90 deg plies would be suitable. Layups for spar and rib areas could suitably be 20% for 0 deg plies; 60% for 45 deg plies and 20% for 90 deg plies. Other design approaches may have layups intermediate these mentioned here, although layups outside these ranges are quite possible.

A complex laminate such as an aircraft wingskin formed from a single multiaxial fabric style would be likely to suffer an unacceptable weight penalty caused by the inability of that style to provide the optimum ratio of fibre orientations in a given part of the laminate efficiently to react the particular stresses applied to that part. The laminate designer would then be forced to make the laminate thicker at that position than would be necessary if using fabrics having ratios of fibre orientation better tailored to the particular stresses applied to that part of the laminate, in use.

In addition, the use of a single multiaxial fabric style can result in excessive stress concentrations at ply "dropoffs". Also such dropoffs can be thicker than desired.

Thus in order to produce an optimum layup for more complex structures, which will offer adequate design tailoring to obviate weight penalties, a large variety of multiaxial fabric styles are presently required in order to approach the tailorability of layups achievable with the tape layup method.

One reason for increased costliness of using multiple multiaxial fabric designs is that for each fabric style, qualification and ultimately certification by the relevant aviation authority would be necessary, thus adding to the overall design, manufacture and certification cost of the layup. Thus the apparent potential of multiaxial fabrics, NCF or otherwise, greatly to increase laminate layup speed and thus reduce cost has in practise not been realised. Even if fabrics are dedicated to particular layups it has not been easy to change from one to another in the same laminate.

SUMMARY OF THE INVENTION

It is an object of the invention to provide an alternative composite laminate and method of manufacturing same which overcome the disadvantages of the prior art.

According to one aspect of the invention there is provided a method of manufacturing a composite laminate, the laminate comprising a series of fabric plies of fibrous reinforcing material set in plastics matrix material, the method including the steps of selecting a relatively small number of fabric styles and combining predetermined selections of them together, when laying up the laminate, to optimise on the one hand design tailoring and obeyance of design rules and, on the other hand, deposition rate. The method thus affords minimal mass penalty compared to layups made from unidirectional tapes, whilst achieving maximum possible layup rate.

Surprisingly, it was found that even where laminate strength and stiffness requirements varied considerably, for example as between aircraft spars and ribs on the one hand and stringers or other local stiffeners on the other, that the ratio of obliquely angled, eg. plus or minus 45 deg, fibres to 90 deg, or weft, fibres did not differ to a great extent. Hence, although it had previously been proposed to use either one or a handed pair of triaxial fabric styles of 0 deg and plus or minus 45 deg fibres, together with a separate 90 deg fabric style, it was decided to try to improve on this type of laminate design. The improvement would use a small number of multiaxial fabric styles together with a small number of unidirectional 0 deg fibre fabric styles. Each multiaxial fabric style would contain obliquely angled fibres and 90 deg fibres in a given ratio and the 0 deg fibre fabric styles would have differing areal masses.

The further surprising result of this was that it was then found that the number of multiaxial fabrics could be reduced to one, preferably having a ratio intermediate upper and lower limits of the said ratio, and still only a small number of the unidirectional 0 deg fabric styles would be required for combination therewith to obtain a laminate which had superior stiffness and strength qualities to known designs using multiaxial fabrics, whilst being both lighter than those designs and much faster to lay up than tape.

A particular example of such a laminate is an aircraft wingskin where it was found that a single multiaxial fabric style having a said ratio of plus or minus 45 deg fibres to 90 deg fibres of 5:1, when combinable with two 0 deg unidirectional fabric styles of differing areal masses, gave the potential for a laminate of equivalent strength/stiffness to a tape-layed laminate and whose excess weight over the tape-layed laminate was of the order of only 2–3%. This compared with approximately 10% excess weight for a design using a single multiaxial fabric style in the layup. This reduction in weight is a consequence of the invention allowing the layup to be reduced in thickness in areas requiring less strength/stiffness. Thus a minimum number of fabric layers may be selected to extend over larger areas and these can then be added to in areas requiring greater strength/stiffness by laminating in further reinforcing layers of fabric.

The laminate of the invention can be expected to approximate far more closely to the design of the tape-layed laminate in key high stress areas.

Similarly, a multiaxial fabric style having a ratio of plus or minus 45 deg fibres to 90 deg fibres of 2.5:1, when combinable with two 0 deg unidirectional fabric styles of differing areal masses, was found to be suitable for layups for both wing spars and ribs and also for stringers.

Hence only a single multiaxial fabric style might be needed for an aircraft wing skin, with blending techniques being used to lay up this style of fabric optionally with one or more 0 deg fabric styles selected from a small range thereof so as to obtain the desired optimised layup and thickness at a given position on the skin. A single further multiaxial fabric style may be used for ribs, spars and stringers with the same or a further small range of unidirectional 0 deg fabrics optionally combinable with it. Although a particular multiaxial fabric style may in the main be more suitable for say a wingskin, on the one hand or stiffeners, on the other hand, design variations may dictate an overlap in styles in practise at certain locations.

The method may therefore include the use of at least one predetermined triaxial fabric style comprising 90 deg and obliquely angled fibres, optionally combinable with at least one unidirectional 0 deg fabric style selected from a group of two, optionally three, or exceptionally more 0 deg fabric styles.

The multiaxial fabrics, in addition to comprising differing fibre orientations from ply to ply, may also have fibres whose modulus differs from ply to ply. The effect of this form of design tailoring is to allow the modulus of a laminate to differ according to the direction of applied force. For example, in an aircraft wingskin stringer, the use of higher modulus fibres in the lengthwise/0 deg/warp direction and high strength (lower modulus) fibres in the plus or minus 45 deg and 90 deg/weft directions allows the use of thinner unidirectional plies and hence lower overall mass, as compared to a stringer made entirely from high strength fibres. In this context the higher modulus "IM" fibres may comprise carbon fibres of approximately 300 GPa and approximately 2% strain; high strength "HS" fibres may be carbon fibres of approximately 240 GPa and approximately 1.5–2% strain.

For an aircraft wingskin application a suitable use of fibres may be HS in the 0 deg/warp/spanwise direction and IM in the plus or minus 45 deg and in the 90 deg directions. This combination allows greater torsional stiffness with lower mass without an increase in spanwise stiffness which may be detrimental to gust load characteristics of the wing.

In addition to fibres of differing modulus, fibres of any type are included within the scope of the invention. By way of example only the invention would be suitable for use with carbon fibres of differing moduli; with glass fibres of "E" and "S" type; with aramid and with ceramic fibres.

A fibre density of 1.78 may be used; and fibre areal mass at 1 mm thickness and 60% volume fraction may be assumed to be 1070 grams per square meter (gsm).

Typical unidirectional fabric style variants may be:

0.5 mm/535 gsm (possibly to be used as main form);

0.3 mm/321 gsm (variant);

0.6 mm/642 gsm (variant);

0.7 mm/749 gsm (further variant, possibly requiring change to design rules).

Typical triaxial fabric styles may be:

|  | +45 deg | 90 deg | −45 deg |
| --- | --- | --- | --- |
| Triaxial 642 (nominal blanket thickness 0.6 mm) | | | |
| gsm | 267.5 | 107 | 267.5 |
| % | 41.7 | 16.6 | 41.7 |
| mm | 0.25 | 0.1 | 0.25 |
| Triaxial 375 (nominal blanket thickness 0.35 mm) | | | |
| gsm | 134 | 107 | 134 |
| % | 35.7 | 28.6 | 35.7 |
| mm | 0.125 | 0.1 | 0.125 |

Triaxial 642 has a ratio of plus or minus 45 deg fibres to 90 deg fibres of 5:1, whereas Triaxial 375 has an equivalent ratio of 2.5:1.

The triaxial fabrics are preferably stitched for handling and permeability reasons, whereas the unidirectional fabrics are often bindered, owing to cost and drape considerations. Unidirectional fabrics may also be stitched however to aid fabric permeability for certain resin infusion methods. Also damage tolerance is improved, with stitching. Carbon stitching material is preferred.

If the different handed versions of the Triaxial 642 are denoted a+ and a− and those of Triaxial 375 are denoted b+ and b−, the following table demonstrates how well these fabric styles may be combined together, even for thin laminates of say 4 mm which is typical of many multi-angular laminates.

Layup 1

Though-thickness composition: a+, 0.5 mm UD, a−, 0.5 mm UD, a−, 0.5 mm UD, a+.

Total thickness: 3.9 mm.

Percentage fibre content: 0 deg—38.5%; 45 deg—51.2%; 90 deg—10.3%.

Ratio of 45 deg fibre to 90 deg fibre: 5:1.

Layup 2

Through-thickness composition: b+, 0.5 mm UD, b−, 0.5 mm UD, b−, 0.5 mm UD, b+.

Total thickness: 2.9 mm.

Percentage fibre content: 0 deg—51.7%; 45 deg—34.5%; 90 deg—13.8%.

Ratio of 45 deg fibre to 90 deg fibre: 2.5:1.

Layup 3

Through-thickness composition: b+, 0.5 mm UD, a−, 0.5 mm UD, a+, 0.5 mm UD, b−.

Total thickness: 3.4 mm.

Percentage fibre content: 0 deg—44.1%; 45 deg—44.1%; 90 deg—11.8%.

Ratio of 45 deg fibre to 90 deg fibre: 3.75:1.

Layup 4

Through-thickness composition: b+, 0.7 mm UD, b−, 0.7 mm UD, b−, 0.7 mm UD, b+.

Total thickness: 3.5 mm.

Percentage fibre content: 0 deg—60%; 45 deg—28.6%; 90 deg—11.4%.

Ratio of 45 deg fibre to 90 deg fibre: 2.5:1.

Layup 5

Through-thickness composition: a+, 0.3 mm UD, a−, 0.3 mmUD, a−, 0.3 mm UD, a+.

Total thickness: 3.3 mm.

Percentage fibre content: 0 deg—27.3%; 45 deg—60.6%; 90 deg—12.1%.

Ratio of 45 deg fibre to 90 deg fibre: 5:1.

Layup 6

Through-thickness composition: b+, 0.3mm UD, b−, 0.3 mm UD, b−, 0.3 mm UD, b+.

Total thickness: 2.3 mm.

Percentage fibre content: 0 deg—39.1%; 45 deg—43.5%; 90 deg—17.4%.

Ratio of 45 deg fibre to 90 deg fibre: 2.5:1.

In the above 6 layups the 0 deg fabrics may be entirely omitted, if the particular laminate allows it. Each of the above fabric styles may additionally be varied by −50% to +100%; or more preferably −10% to +25%, as desired. With thicker structures the ability to tailor fabrics improves.

Fibre tow size is not thought to be critical to the invention in the context of airframe structural design but 3000, 6000, 12000, 24000 or 48000 tow sizes are thought to be suitable in any event, with even higher numbers of fibres per tow being possible.

BRIEF DESCRIPTION OF THE DRAWING

The invention will now be described by way of example only with reference to the drawing.

The drawing shows schematically a spanwise section through an aircraft wingskin.

DETAILED DISCUSSION OF PREFERRED EMBODIMENTS

In the drawing layup optimization according to the invention has been utilized to create a layup whose fibre orientation ratio and thickness varies in the spanwise direction (NB in practice it would also vary in the chordwise direction.

The horizontal lines 1 to 15 each represent fabrics, with their areal weight in grams per square meter; type, ie Triaxial or Unidirectional; their handedness, A or B or whether 0 deg or 90 deg, and their consecutive number marked on the right hand side of the figure. It will be observed that fabrics 1, 2, 3, 5, 11, 13, 14 and 15 are continuous, whereas fabrics 4, 6, 7, 8, 9, 10, and 12 are discontinuous. It will also be observed that the latter fabrics all terminate within transition regions 16 and 17. Discontinuities of the fabrics are as far as possible confined to positions as close as possible to the neutral axis 18 of the layup. Constant thickness regions 19, 20 and 21 have percentage fibre content ratios of 0 deg, plus or minus 45 deg and 90 deg fibres respectively of approximately 25:50:25; 50:40:10 and 30:60:10, and respective total thicknesses of 8.5 mm; 6.1 mm and 4.3 mm.

Thus it can be readily seen how layup carried out according to the method of the invention provides enormous design flexibility for the said fibre content ratios, when measured spanwise along the wing. All ply dropoffs follow the aforementioned 20x rule.

Although the invention has been discussed largely in the context of NCFs, it is equally applicable to crimped fabrics where these may be used, for example in lower strength applications.

What is claimed is:

1. A method of manufacturing a composite laminate, the laminate comprising a series of fabric plies of fibrous reinforcing material set in plastics matrix material, the method including the steps of:

providing at least one multiaxial fabric style comprising 90 deg and obliquely angled fibres and at least one unidirectional 0 deg fabric style, selecting at least one of said fabric styles according to design requirements for a particular portion of the laminate, laying up said portion with the said selection, and repeating the said selection and laying up steps as required to complete layup of the laminate, further including the steps of:

determining the ratio of required fibre content of obliquely angled and 90 deg orientated fibre in differing portions of the laminate for optimum stiffness thereof, determining an intermediate value of said ratio, and selecting at least a multiaxial fabric style having fibre orientations in said intermediate value of said ratio.

2. A method as in claim 1 in which at least one said multiaxial fabric style comprises a triaxial fabric style.

3. A method as in claim 1 in which the at least one multiaxial fabric style comprises two oppositely handed versions of a single triaxial fabric style.

4. A method as in claim 1 in which the at least one unidirectional 0 deg fabric style comprises at least two unidirectional 0 deg fabric styles.

5. A method as in claim 1 in which the said intermediate ratio is substantially within the range 4.5 to 5.5:1.

6. A method as in claim 1 in which the said intermediate ratio is substantially 5:1.

7. A method as in claim 1 in which the said intermediate ratio is substantially within the range 2.0 to 3.0:1.

8. A method as in claim 1 in which the said intermediate ratio is substantially 2.5:1.

9. A method as in claim 5 including the step of providing two 0 deg unidirectional fabric styles from which to choose.

* * * * *